United States Patent
Muller et al.

[15] 3,676,461
[45] July 11, 1972

[54] 1-OXA-A-NOR-STEROIDS

[72] Inventors: Georges Muller, Nogent sur Marne; Roland Bardoneschi, le Vert Galant, both of France

[73] Assignee: Roussel UcLaf, Paris, France

[22] Filed: July 7, 1969

[21] Appl. No.: 839,706

[30] Foreign Application Priority Data

July 24, 1968 France....................................160425

[52] U.S. Cl. ................260/343.3, 260/247.7 A, 260/293.65, 260/326.5 C, 260/348 C, 260/563 P, 260/586 A, 424/279
[51] Int. Cl. ..........................................................C07d 5/34
[58] Field of Search................................................260/343.3

[56] References Cited

UNITED STATES PATENTS 3,483,223  12/1969  Levine et al. .........................260/343.3

Primary Examiner—Alex Mazel
Assistant Examiner—Anne Marie T. Tighe
Attorney—Hammond & Littell

[57] ABSTRACT

1-Oxa-13$\beta$-$R_1$-17$\alpha$-methyl-A-nor-$\Delta^{3(5),9}$-gonadienes of the formula

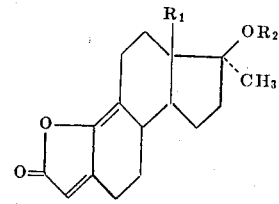

wherein $R_1$ is alkyl of one to three carbon atoms and $R_2$ is acyl of an aliphatic carboxylic acid of two to four carbon atoms having antiandrogenic activity and their preparation and intermediates formed therein.

8 Claims, No Drawings

1-OXA-A-NOR-STEROIDS

STATE OF THE ART

There are known 2-oxa-$\Delta^{4,9}$-diene steroids such as 2-oxa-17$\beta$-acetoxy-$\Delta^{4,9}$-estradiene-3-one which possess anabolic and androgenic activity. In copending, commonly assigned U.S. Pat. application Ser. No. 839659, filed on even date herewith, there are disclosed 1-oxa-A-nor-$\Delta^{3(5),9}$-estradiene-17$\beta$-ol-2-one and esters and ethers thereof which possess antiandrogenic activity. The compounds of the present invention maintain antiandrogenic activity even with the 17$\alpha$-methyl group and presence of the acyl group in the 17$\beta$-position prolongs the activity of the compounds when taken orally.

OBJECTS OF THE INVENTION

It is an object of the invention to provide 1-oxa-17$\alpha$-methyl-17$\beta$-OR$_2$-A-nor-steroids of formula I.

It is another object of the invention to provide a process for the preparation of the compounds of formula I and to novel intermediates produced therein.

It is a further object of the invention to provide antiandrogenic compositions.

These and other objects and advantages of the invention will become obvious from the following detailed description.

THE INVENTION

The compounds of the invention are 1-oxa-13$\beta$-R$_1$-17$\beta$-OR$_2$-17$\alpha$-methyl-A-nor-$\Delta^{3(5),9}$-gonadienes of the formula

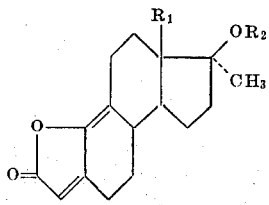

I wherein R$_1$ is alkyl of one to three carbon atoms and R$_2$ is acyl of an aliphatic carboxylic acid of two to four carbon atoms. A particularly preferred compound is when R$_1$ is methyl and R$_2$ acetyl although R$_1$ may be methyl, ethyl, n-propyl or isopropyl and R$_2$ may be derived from acetic acid, propionic acid, butyric acid, isobutyric acid, etc.

The process of the invention for the preparation of compounds of formula I comprises reacting a 5-enamino-13$\beta$-R$_1$-17$\alpha$-methyl-des-A-$\Delta^{5(10),9(11)}$-gonadiene-17 and -ol of the formula

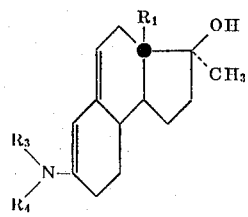

II wherein R$_1$ is alkyl of one to three carbon atoms, and R$_3$ and R$_4$ may be different and are alkyl of one to six carbon atoms together with the nitrogen atom to which they are attached form a substituted or unsubstituted heterocyclic radical which may contain an oxygen atom with a lower aliphatic carboxylic acid to form the corresponding 13$\beta$-R$_1$-17$\alpha$-methyl-des-A-$\Delta^9$-gonene-17$\beta$-ol-5-one of the formula

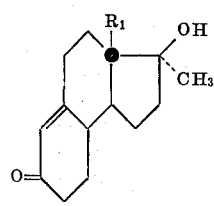

III reacting the latter with an epoxidation agent to obtain the corresponding 9$\beta$,10$\beta$-epoxy-13$\beta$-R$_1$-17$\alpha$-methyl-des-A-gonane-17$\beta$-ol-5-one of the formula

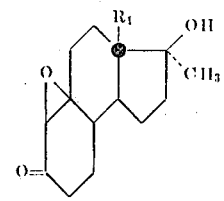

IV reacting the latter with a lower alkyl haloacetate in the presence of zinc to form a 5$\beta$-alkoxycarbonylmethyl-9$\beta$,10$\beta$-epoxy-13$\beta$-R$_1$-17$\alpha$-methyl-des-A-gonane-5$\alpha$,17$\beta$-diol of the formula

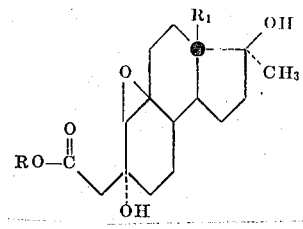

V wherein R is lower alkyl, treating the latter with a hydrogen halide to form the corresponding 1-oxa-9$\alpha$-halo-17$\alpha$-methyl-A-nor-10$\alpha$-gonane-5$\alpha$,17$\beta$-diol-2-one of the formula

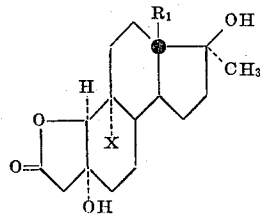

VI wherein X is chlorine or bromine and reacting the latter with an aliphatic acid anhydride of two to four carbon atoms in the presence of an organic tertiary base to form the desired compound of formula I.

In preferred embodiments of the invention, the enamino is piperidino, morpholino or pyrrolidino and the lower aliphatic carboxylic acid is dilute propionic acid or acetic acid. The epoxidation agent is hydrogen peroxide in an alkaline alcoholic media. The lower alkyl haloacetate is preferably methyl or ethyl bromoacetate, methyl or ethyl chloroacetate or methyl or ethyl iodoacetate. The tertiary organic base is pyridine or collidine.

The 5-enamino starting materials of formula II may be prepared by the process of commonly assigned, copending U.S. Pat. application Ser. No. 752,467, filed Aug. 14, 1968, now U.S. Pat. No. 3,595,877 which comprises oxidizing 13$\beta$-R$_1$-des-A-$\Delta^9$-gonene-17$\beta$-ol-5-one wherein R$_1$ has the above definition to form 13$\beta$-R$_1$-des-A-$\Delta^9$-gonene-5,17-dione, reacting the latter with a secondary amine of the formula

wherein R$_3$ and R$_4$ have the above definition and reacting the latter with a methylating agent such as methyl lithium or a methyl magnesium halide to form the corresponding 5-enamino of formula II.

5-Pyrrolidino-13$\beta$-n-propyl-17$\beta$-benzoyloxy-des-A-$\Delta^{5(10),9(11)}$-gonadiene (described in U.S. Pat. No. 3,115,507) may be saponified to the corresponding 17$\beta$-ol compound which can then be oxidized to the corresponding 17-one which can be reacted with methyl lithium to obtain 5-pyrrolidino-13$\beta$-n-propyl-17$\alpha$-methyl-des-A-$\Delta^{5(10),9(11)}$-gonadiene-17$\beta$-ol.

The antiandrogenic compositions comprise at least one compound of formula I a pharmaceutical carrier. The compositions may be in the form of injectable solutions or suspensions in ampules or multiple-dose flacons or in the form of tablets, coated tablets, capsules, sublingual tablets, suppositories, pomades, creams or lotions prepared in known ways. They are useful for the treatment of hyperandrogenia or acne.

In the following example there are described several preferred embodiments to illustrate the invention. However, it should be understood that the invention is not intended to be limited to the specific embodiments.

EXAMPLE

Preparation of 1-oxa-17α-methyl-17β-acetoxy-A-nor-Δ$^{3(5),9}$-estradiene-2-one

STEP A: 17α-methyl-des-A-Δ$^9$-estraene-17β-ol-5-one 72.5 gm of 5-pyrrolidino-17α-methyl-des-A-Δ$^{5(10),9(11)}$-estradiene-17β-ol (described in copending U.S. Pat. application Ser. No. 752,467) were dissolved in 130 cc pure acetic acid and 1,250 cc of water and the solution was stirred overnight at room temperature. The reaction mixture was made alkaline by the addition of 1,150 cc of 2N sodium hydroxide and was then extracted with methylene chloride. The organic phase was washed with water, then with hydrochloric acid then with water, dried over sodium sulfate and distilled to dryness at a temperature less than 40° C. The residue was purified by triturating with isopropyl ether to obtain 43.1 gm of raw 17α-methyl-des-A-Δ$^9$-estraene-17β-ol-5-one melting at 113°–114° C.

For analysis, the product was purified by chromatography and trituration with isopropyl ether to obtain the product having a melting point of 125° C. and a specific rotation $[\alpha]_D^{20} = -55.2°$ ($c = 0.5$ percent in methanol).

STEP B: 9β,10β-epoxy-17α-methyl-des-A-estrane-17β-ol-5-one 5 gm of 17α-methyl-des-A-Δ$^9$-estraene-17β-ol-5-one were dissolved in 50 cc of pure anhydrous methanol and after cooling to 5° C., 1 cc of 36° Bé sodium hydroxide solution and then 5 cc of 30 percent hydrogen peroxide were added thereto. The reaction mixture was stirred at 5° C. for 5 hours and then was poured into water and extracted with methylene chloride. The extract was washed with water, dried and distilled in vacuo. The residue was recrystallized from a mixture of isopropyl ether-methylene chloride to obtain 3.14 gm of 9β,10β-epoxy-17α-methyl-des-A-estrane-17β-ol-5-one having a melting point of 139° C. and a specific rotation $[\alpha]_D^{20} = -122° \pm 3°$ ($c = 0.5$ percent in chloroform).

Analysis: $C_{15}H_{22}O_3$; molecular weight = 250.33
Calculated: C 71.97% H 8.86%
Found: 71.9 8.8

As far as is known, this compound is not described in the literature.

STEP C: 5-ethoxycarbonylmethyl-9β,10β-epoxy-17α-methyl-des-A-estrane-5α,17β-diol 1 gm of 9β,10β-epoxy-17α-methyl-des-A-estrane-17β-ol-5-one was dissolved in 30 cc of anhydrous tetrahydrofuran and then 30 cc of an 0.8 M solution of the zinc derivative of ethyl bromoacetate in methylal was added thereto. The reaction mixture was stirred at room temperature for 1 hour and then was poured into ice water. The mixture was acidified with 2 N hydrochloric acid and was then extracted with ether. The ether extract was washed with water, dried and distilled to dryness. The residue consisted of 5β-ethoxycarbonylmethyl-9β,10β-epoxy-17α-methyl-des-A-estrane-5α,17β-diol which was used as is for the next synthesis step.

As far as is known, this compound is not described in the literature.

STEP D: 1-oxa-9α-chloro-17α-methyl-A-nor-10α-estrane-5α,17β-diol-2-one

The product obtained in Step C was dissolved in 15 cc of acetone and after the addition of 6 cc of 5 N hydrochloric acid thereto, the resulting solution was held at room temperature for 3 hours. After ice cooling, the precipitate was vacuum filtered to obtain 710 mg of 1-oxa-9α-chloro-17α-methyl-A-nor-10α-estrane-5α,17β-diol-2-one melting at 255° C. A sample of the said product purified by recrystallization from acetone had a melting point of 255° C. and a specific rotation $[\alpha]_D^{20} = -86° \pm 3°$ ($c = 0.46$ percent in pyridine).

Analysis: $C_{17}H_{25}O_4Cl$; molecular weight = 328.83
Calculated: C 62.09% H 7.66% Cl 10.78%
Found: 61.8 7.6 10.5

As far as is known, this compound is not described in the literature.

STEP E: 1-oxa-17α-methyl-17β-acetoxy-A-nor-Δ$^{3(5),9}$-estradiene-2-one.

980 mg of 1-oxa-9α-chloro-17α-methyl-A-nor-10α-estrane-5α,17β-diol-2-one were introduced into a mixture of 16 cc of pyridine and 4 cc of acetic acid anhydride and the mixture was then refluxed under a nitrogen atmosphere for 5 hours. After cooling, 4 cc of water were added to the reaction mixture and after the reaction was over, the mixture was poured over ice. The pH was adjusted to 1 by the addition of 2 N hydrochloric acid and the mixture was then extracted with methylene chloride. The organic extracts were washed with water, then with an aqueous solution of sodium bicarbonate, dried and distilled to dryness. The residue was dissolved in methylene chloride and the solution was chromatographed over alumina with elution with methylene chloride. The solution was distilled to dryness and the residue was recrystallized from ether to obtain 385 mg of 1-oxa-17α-methyl-17β-acetoxy-A-nor-Δ$^{3(5),9}$-estradiene-2-one melting at 208° C. A sample of the said product upon recrystallization from a mixture of methylene chloride and isopropyl ether had a melting point of 210° C. and a specific rotation $[\alpha]_D^{20} = -58° \pm 2°$ ($c = 0.40$ percent in chloroform).

Analysis: $C_{19}H_{24}O_4$; molecular weight = 316.38
Calculated: C 72.12% H 7.65%
Found: 71.9 7.7

As far as is known, this compound is not described in the literature.

Various modifications of the compositions and process of the invention may be made without departing from the spirit or scope thereof.

We claim:

1. A 1-oxa-13β-R$_1$-17α-methyl-A-nor-Δ$^{3(5),9}$-gonadiene of the formula

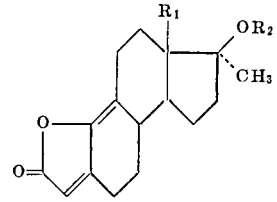

wherein R$_1$ is alkyl of one to three carbon atoms and R$_2$ is acyl of an alkanoic carboxylic acid of two to four carbon atoms.

2. A compound of claim 1 wherein R$_1$ is methyl and R$_2$ is acetyl.

3. A process for the preparation of a compound of claim 1 which comprises reacting a 5-enamino-13β-R$_1$-17α-methyl-des-A-Δ$^{5,(10),9(11)}$-gonadiene-17β-ol of the formula

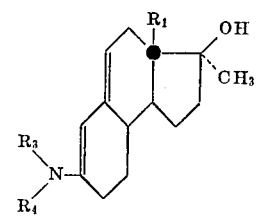

II wherein $R_1$ is alkyl of one to three carbon atoms, and $R_3$ and $R_4$ may be different and are alkyl of one to six carbon atoms and together with the nitrogen atom to which they are attached form a member selected from the group consisting of pyrrolidino, piperidino and morpholino with a lower alkanoic carboxylic acid to form the corresponding $13\beta$-$R_1$-$17\alpha$-methyl-des-A-$\Delta^9$-gonene-$17\beta$-ol-5-one of the formula

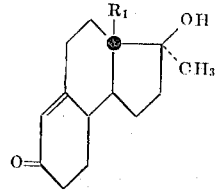

III reacting the latter with an epoxidation agent to obtain the corresponding $9\beta,10\beta$-epoxy-$13\beta$-$R_1$-$17\alpha$-methyl-des-A-gonane-$17\beta$-ol-5-one of the formula

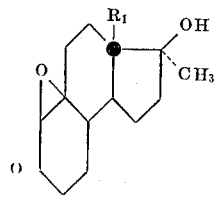

IV reacting the latter with a lower alkyl haloacetate in the presence of zinc to form a $5\beta$-alkoxycarbonylmethyl-$9\beta,10\beta$-epoxy-$13\beta$-$R_1$-$17\alpha$-methyl-des-A-gonane-$5\alpha,17\beta$-diol of the formula

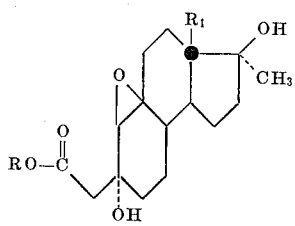

V wherein R is lower alkyl, treating the latter with a hydrogen halide to form the corresponding 1-oxa-$9\alpha$-halo-$17\alpha$-methyl-A-nor-$10\alpha$-gonane-$5\beta,17\beta$-diol-2-one of the formula

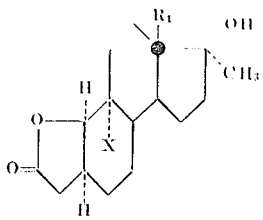

VI wherein X is chlorine or bromine and reacting the latter with an alkanoic acid anhydride of two to four carbon atoms in the presence of an organic tertiary base to form the desired compound of claim 1.

4. A process of claim 3 wherein the group

is selected from the group consisting of piperidino, morpholino and pyrrolidino.

5. The process of claim 3 wherein the epoxidation agent is hydrogen peroxide in an alkaline alcoholic media.

6. The process of claim 3 wherein the lower alkyl haloacetate is selected from the group consisting of methyl and ethyl bromoacetate, methyl and ethyl chloroacetate and methyl and ethyl iodoacetate.

7. A compound of the formula

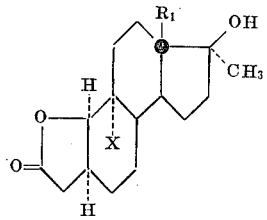

wherein $R_1$ is alkyl of one to three carbon atoms and X is a halogen.

8. A compound of claim 7 which is 1-oxa-$9\alpha$-chloro-$17\alpha$-methyl-A-nor-$10\alpha$-estrane-$5\alpha,17\beta$-diol-2-one.

* * * * *